Nov. 17, 1959  H. A. DE CENZO ET AL  2,913,262
SPLIT COUPLING FOR JOINING BEADED TUBES
Filed July 1, 1957
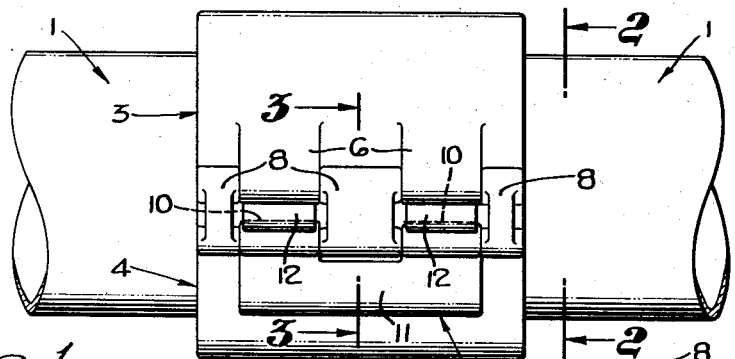
Fig. 1.
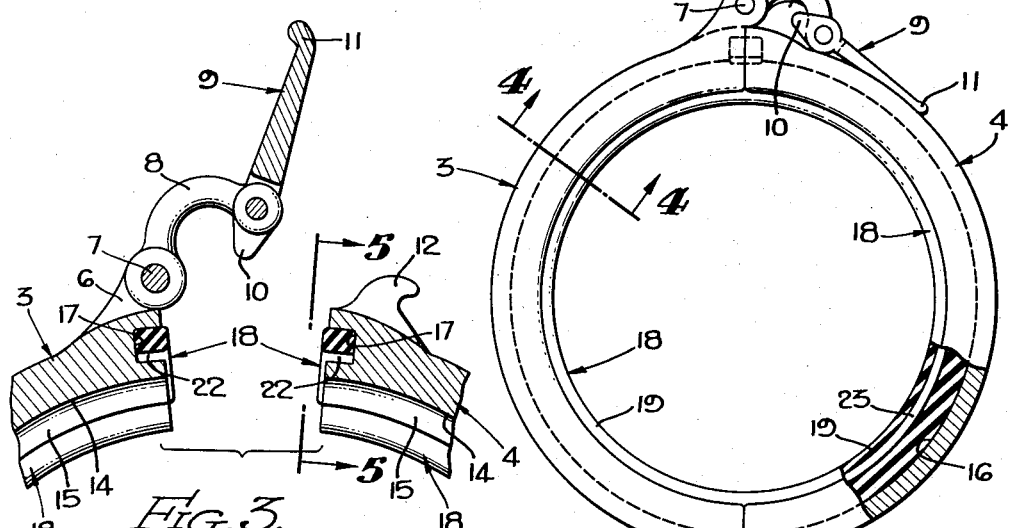
Fig. 3.  Fig. 2.
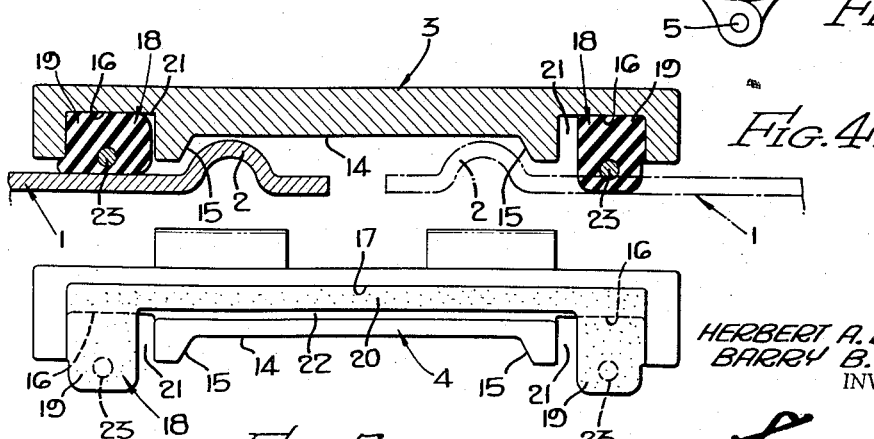
Fig. 4.
Fig. 5.
HERBERT A. DeCENZO
BARRY B. WILLIS
INVENTORS
BY Lyon & Lyon
ATTORNEYS

United States Patent Office 2,913,262
Patented Nov. 17, 1959

2,913,262

SPLIT COUPLING FOR JOINING BEADED TUBES

Herbert A. De Cenzo, Arcadia, and Barry B. Willis, La Canada, Calif., assignors to On Mark Couplings, Inc., Los Angeles, Calif., a corporation of California Application July 1, 1957, Serial No. 669,014

2 Claims. (Cl. 285—233)

This invention relates to split couplings, and included in the objects of this invention are:

First, to provide a coupling for joining a pair of beaded tubes which comprises complementary semicylindrical sections adapted to be fitted over opposite sides of a pair of confronting tubes and joined together to form a fluid-tight seal between the tubes.

Second, to provide a plit coupling for beaded tubes which incorporates novelly arranged continuous seal means, which include complementary semicircular seal elements and confronting axially directed seal elements, which effect a complete seal between coupling and tubes as well as between the sections of the coupling.

Third, to provide a split coupling which may be readily and quickly installed or removed with a minimum use of tools.

With the above and other objects in view, as may appear hereinafter, reference is directed to the accompanying drawings in which:

Figure 1 is a side view of the split coupling shown in position connecting a pair of tubes, the tubes being shown fragmentarily;

Fig. 2 is an enlarged end view from the line 2—2 of Fig. 1 with the tube omitted, and a portion of the coupling shown in section;

Fig. 3 is a further enlarged sectional view through 3—3 of Fig. 1, showing the coupling separated;

Fig. 4 is an enlarged, longitudinal, sectional view through 4—4 of Fig. 2;

Fig. 5 is an elevational view taken along the plane 5—5 of Fig. 3, showing a circumferential end of one of the coupling bodies.

The split coupling is intended to connect tubing sections 1 having annular, externally rolled, beads 2 adjacent their extremities. The split coupling includes a complementary pair of semicylindrical coupling bodies 3 and 4. The coupling bodies are joined at one circumferential extremity by a hinge 5.

The other circumferential extremity of the coupling body 3 is provided with hinge lugs 6 between which extends a journal pin 7. Arcuate latch arms 8 are journalled on the pin 7, and in turn journal at their extremities a latch lever 9. The latch lever 9 includes a cam means 10 at one end, the other end forming a handle 11.

Adjacent the corresponding extremity of the coupling body 4 there is provided keeper members 12 in the form of hooked bosses which receive the cam means 10, so that as the latch lever 9 is pivoted toward the position shown in Fig. 2 the coupling bodies are drawn together.

While in the construction illustrated a hinge 5 is provided, it should be noted that both circumferential extremities of the coupling bodies 3 and 4 may be joined by the latching means formed by the latch lever 9 and keeper member 12, in which case the two coupling bodies would be identical in construction.

The coupling bodies 3 and 4 define a central channel 14 of sufficient width to bridge between the beads 2 of the tubing sections 1, as shown best in Figs. 4 and 5.

Shoulders 15 are formed at the axial extremities of the channel 14 which, when the coupling bodies 3 and 4 are joined, radially overlap the beads 2 to restrain the tubing sections 1 against separation.

The portions of the coupling bodies 3 and 4 axially beyond the shoulders 15 confront the tubing sections 1 and are provided with circumferential grooves 16. The circumferential ends of the coupling bodies 3 and 4 are provided with axial grooves 17 which extend between and join the circumferential grooves 16.

The circumferential grooves 16 and axial grooves 17 receive yieldable seal members 18 formed of rubber, synthetic rubber, or other suitable elastomer. Each seal member includes circumferential sealing sections 19 within the grooves 16 and axial sealing sections 20 within the grooves 17. The circumferential sealing sections 19 are bonded to the radially outer and axially outer walls of the grooves 16 and are spaced from the axially inner walls thereof to form pressure channels 21. Simultaneously, the axial sealing sections 20 are bonded to the radially outer walls of the axial grooves 17 to form pressure channels 22.

The circumferential sealing sections 19 project radially inwardly from the body members, and to a lesser extent the axial sealing sections 20, as well as the circumferential extremities of the sealing sections 19, project from the circumferential end faces of the coupling bodies 3 and 4. Consequently, when the coupling bodies are clamped around a pair of tubing sections 1, the seal member 18 is compressed and deformed so as to partially fill the channels 21 and 22.

Molded within each circumferential sealing section 19 and extending the circumferential length thereof is a reinforcing member 23 which may be a single strand wire or a multi-strand cable. The reinforcing member 23 serves to prevent axial flow of the seal member 18 through the space between the axial extremities of the coupling bodies 3 and 4 and the tubing sections 1, under conditions of high pressure within the tubing sections and coupling bodies.

The split coupling is installed as follows:

The coupling bodies 3 and 4 are spread apart sufficiently to permit the coupling to be slipped sideways over a pair of tubing sections to be joined. Alternatively, the split coupling may be opened sufficiently to slip the coupling endwise, that is, axially over one of the tubing sections, whereupon the mating tubing section 1 is brought into position and the coupling moved axially to a centered position relative to the tubing sections.

In either case, after positioning the coupling so that the beads 2 are within the channel 14, the latch lever 9 is pivoted about the keeper members 12 so as to draw the coupling bodies 3 and 4 together. The latch lever is movable past center so as to lock the coupling bodies tightly together. In doing so, the axial sealing sections 20 mutually engage to seal the confronting ends of the coupling bodies 3 and 4, and the circumferential sealing sections 9 compress against the tubing sections 1 to form a seal.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A split coupling for joining a pair of confronting tubular members in a fluid-tight seal, each of the tubular members having an annular bead at its confronting end, said coupling including: a pair of complementary semicyclindrical coupling body members adapted to fit over the confronting ends of the pair of tubular members and having an axial length sufficient to bridge the annular beads at the ends of the tubular members, a hinge for joining in hinged relationship the complementary body members at one pair of their respective circumferential extremities, at least one latching arm pivotally mounted on the other circumferential extremity of one of the body members, at least one hooked boss member formed at the other circumferential extremity of the other of the body members to receive the latching arm when the arm is pivoted into a latched position so as to draw the coupling members together about the ends of the confronting tubular members, a pair of integral annular shoulders formed on the inner surface of each of the semicylindrical body members and spaced axially from one another a distance to permit the shoulders to overlap respective ones of the annular beads on the confronting ends of the tubular members so as to restrain the tubular members against axial separation, each of the semicylindrical body members having respective integral end portions extending axially beyond said annular shoulders and each of the end portions having an internal annular groove formed therein, each of said circumferential extremities of the semicylindrical body members having an axial groove formed in the end face thereof extending between and joining corresponding ones of said internal annular grooves, a yielding sealing member disposed in the annular grooves and in the axial grooves and projecting radially inwardly from each of the semicylindrical body members and extending circumferentially outwardly from the end faces of the circumferential extremities thereof, said sealing member being bonded to one of the walls of each of the grooves and spaced from the other wall of each of the grooves to form pressure channels, so that latching of the latching arm to clamp the coupling body members about the confronting ends of the tubular members causes said shoulders to overlap the beads on the tubular members and causes the sealing members to be compressed so as to fill the grooves and form a sealing bond with the tubular members.

2. The combination defined in claim 1 and which includes a metallic wire annular reinforcing member molded within the sealing member in each of the annular grooves to prevent excessive axial flow of the sealing member when the assembly is clamped into position.

References Cited in the file of this patent

UNITED STATES PATENTS

| | | |
|---|---|---|
| 320,771 | Ford | June 23, 1885 |
| 1,369,913 | Brunhoff | Mar. 1, 1921 |
| 1,956,683 | Hewitt | May 1, 1934 |
| 2,460,032 | Risley | Jan. 25, 1949 |
| 2,531,401 | Clerke | Nov. 28, 1950 |
| 2,751,806 | Dickie | June 26, 1956 |
| 2,778,661 | Leighton | Jan. 22, 1957 |
| 2,826,437 | Detweiler | Mar. 11, 1958 |
| 2,828,986 | Mahoff | Apr. 1, 1958 |

FOREIGN PATENTS

| | | |
|---|---|---|
| 447,660 | Great Britain | May 22, 1936 |
| 527,653 | Great Britain | Oct. 14, 1940 |
| 1,046,161 | France | July 8, 1953 |
| 740,433 | Great Britain | Nov. 9, 1955 |
| 650,567 | France | Sept. 24, 1958 |